(12) United States Patent
Honig et al.

(10) Patent No.: US 11,494,727 B2
(45) Date of Patent: Nov. 8, 2022

(54) JOB VERIFICATION METHOD AND SYSTEM BASED ON CODE SCANNING

(71) Applicant: TruckPay Inc., Tenafly, NJ (US)

(72) Inventors: Barry Scott Honig, Tenafly, NJ (US); Benjamin Martin Honig, New York, NY (US)

(73) Assignee: TruckPay Inc., Tenafly, NJ (US)

( * ) Notice: Subject to any disclaimer, the term of this patent is extended or adjusted under 35 U.S.C. 154(b) by 625 days.

(21) Appl. No.: 15/670,571

(22) Filed: Aug. 7, 2017

(65) Prior Publication Data

US 2018/0046981 A1 Feb. 15, 2018

Related U.S. Application Data

(60) Provisional application No. 62/373,694, filed on Aug. 11, 2016.

(51) Int. Cl.
| | |
|---|---|
| *G06Q 10/08* | (2012.01) |
| *G06Q 30/04* | (2012.01) |
| *G06Q 10/06* | (2012.01) |

(52) U.S. Cl.
CPC ..... *G06Q 10/0833* (2013.01); *G06Q 10/0637* (2013.01); *G06Q 30/04* (2013.01)

(58) Field of Classification Search
USPC .......................................... 705/338, 7.11, 1.1
See application file for complete search history.

(56) References Cited

U.S. PATENT DOCUMENTS

| | | | |
|---|---|---|---|
| 9,940,601 B2* | 4/2018 | Hubner | G06Q 50/32 |
| 10,936,991 B2* | 3/2021 | Zamer | G06Q 10/0834 |
| 2003/0018509 A1* | 1/2003 | Ossip | G06Q 10/109 |
| | | | 705/7.16 |
| 2005/0027504 A1* | 2/2005 | Watanabe | G06F 11/3457 |
| | | | 703/22 |

(Continued)

OTHER PUBLICATIONS

Fujita, Masahiro, Indradeep Ghosh, and Mukul. Prasad. Verification Techniques for System-Level Design. 1st edition. Amsterdam;: Morgan Kaufmann Publishers, 2008. Print. (Year: 2008).*

*Primary Examiner* — Akiba K Robinson
(74) *Attorney, Agent, or Firm* — Meister Seelig & Fein LLP

(57) ABSTRACT

A method and system for verifying job deliveries, the method comprising storing, by a server, at least one job item in a database of a server, receiving, by the server, delivery data associated with the job item, the delivery data received from a first client device and including a first location data from the first client device, generating, by the server, a token associated with the delivery data, transmitting, by the server, the token to the first client device, wherein the first client device generates a scanning code that represents the token, receiving, by the server, the token and a second location data from a second client device, the token decoded from the scanning code by the second client device. The method further comprising verifying, by the server, the delivery data based on a determination that the first location and the second location data are within a given distance from each other, and transmitting, by the server, the delivery data and a verification of the delivery data to the second client device.

26 Claims, 19 Drawing Sheets

(56) References Cited

U.S. PATENT DOCUMENTS

| | | | | |
|---|---|---|---|---|
| 2006/0178986 | A1* | 8/2006 | Giordano | G06Q 20/20 |
| | | | | 705/40 |
| 2007/0150387 | A1* | 6/2007 | Seubert | G06Q 40/00 |
| | | | | 705/31 |
| 2008/0184248 | A1* | 7/2008 | Barua | G06F 9/4843 |
| | | | | 718/104 |
| 2010/0014784 | A1* | 1/2010 | Silverbrook | G06K 9/228 |
| | | | | 382/313 |
| 2011/0022503 | A1* | 1/2011 | Parker-Yules | G06Q 20/3223 |
| | | | | 705/32 |
| 2014/0006302 | A1* | 1/2014 | McQuillan | G06Q 10/083 |
| | | | | 705/337 |
| 2014/0201747 | A1* | 7/2014 | Pattnaik | G06F 11/3089 |
| | | | | 718/101 |
| 2016/0380997 | A1* | 12/2016 | Blasi | H04L 63/0807 |
| | | | | 726/9 |
| 2017/0346851 | A1* | 11/2017 | Drake | H04W 12/02 |
| 2018/0302408 | A1* | 10/2018 | Touati | H04W 12/06 |
| 2019/0057348 | A1* | 2/2019 | Zamer | G06Q 10/0834 |

* cited by examiner

●●○○○ Verizon 📶  4:52 PM  ✓ 73% 🔋✚

←      CREATE A NEW SITE

Site Name

Street Address      ZIP

City      State

COORDINATES

Start Date of Work

Projected End Date of Work

Site Open Time

Site Close Time

Fig. 2

JOB ROUTE DETAILS

Invoice Due Frequency

Payment Due Frequency

Check-In Type     QR Code    SELF

Scan Location?     PICKUP    DROP

Payee of Scan Fee?    COMPANY    DRIVER

Require Picture of Load?

Check-In Geo Fence

Use Job Board Service?

ADD JOB

Fig. 4

●●ooo Verizon 🔗　　4:53 PM　　✈ 74% ▭⚡

≡　　　　　JOBS　　　　　✦

CURRENT　　PENDING　　PAST

CURRENTLY INACTIVE

Bens Dump Truck Job

TruckPay HQ　　　　　　$50.00 /Load
Dump Truck (2/5)　　　　　< 1 mi
July 19, 2017 - November 19, 2017

Preferred Driver Bid

TruckPay HQ　　　　　　$45.00 /Load
Dump Truck (0/5)　　　　　< 1 mi
July 27, 2017 - November 19, 2017

Fig. 5

●●●●● Verizon LTE　　7:55 PM　　　✈ ✱ 60% ▇▇▇▸

←　　　　　　Test

GENERAL INFORMATION

Amount　　　　　　　　　$50.00/ Load

Equipment Type　　　　　Bottom Dump

Material Type　　　　　　Lime Stone Base

Scan Fee Payer　　　　　　Company

DISTANCE INFORMATION

To Pick-Up　　　　　　　1652.79 mi

Pick-Up To Drop Off　　　1660.47 mi

DRIVERS

704 — Assign Drivers　　　　　　　Assign

702 — Auto Award Bids　　　　　　　⬤

Fig. 7

●●●●○ Verizon LTE　　　7:52 PM　　　✔ ✳ 60% ▇▇▇▷↯

←　　　CREATE NEW COMPANY

Company Name

Company Federal Tax Type

Minority Company?　　　YES　　NO

Minority Company Type
Owned by Disabled Person

Pacific Asian American
Subcontinent American
Native American
Owned By Disabled Person Minority Company Certification Number Company Description

Fig. 13

- ADD TRUCK

Truck Name

Vehicle Identification #

License Plate #

Capacity (# of tons)

Tank Size

Tank Size Units       GALLONS   LITERS

Fuel Usage (Miles Per Gallon)

Upload Vehicle Insurance Document

JOB VERIFICATION METHOD AND SYSTEM BASED ON CODE SCANNING

CROSS REFERENCE TO RELATED APPLICATION

This application claims the priority of U.S. Provisional Application No. 62/373,694, entitled "JOB VERIFICATION METHOD AND SYSTEM BASED ON CODE SCANNING," filed on Aug. 11, 2016, the disclosure of which is hereby incorporated by reference in its entirety.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

Field of the Invention

This application generally relates to documenting jobs, and in particular, recording and verifying on-site deliveries and services.

Description of the Related Art

Entities often hire or otherwise contract with one or more organizations to perform services, build products, or the like for the entities. Conventionally, acknowledging a pick-up or drop-off of deliveries or jobs is done with paper tickets, e.g., for acknowledging the pick up or drop off of a load of dirt, to and from a particular site location. That is, the person who scans the driver or workmen in, would be handing out paper tickets.

Existing methods do not adequately account for location data-based verification and centralized tracking or documentation of jobs. There is thus a need to implement a digital ticketing system for documenting jobs and establishing a data trail thereof.

SUMMARY OF THE INVENTION

The present invention provides a method, system, and non-transitory computer-readable media for verifying job deliveries. The method comprises storing, by a server, at least one job item in a database, receiving, by the server, delivery data associated with the job item, the delivery data received from a first client device and including a first location data from the first client device, generating, by the server, a token associated with the delivery data, transmitting, by the server, the token to the first client device, wherein the first client device generates a scanning code that represents the token, receiving, by the server, the token and a second location data from a second client device, the token decoded from the scanning code by the second client device. The method further comprises verifying, by the server, the delivery data based on a determination that the first location and the second location data are within a given distance from each other, and transmitting, by the server, the delivery data and a verification of the delivery data to the second client device.

The delivery data may include an activity such as a pick-up, drop-off, delivery, service, job, or task. The delivery data could also include one or more photographs associated with a completion of the job item. The scanning code may comprise either a bar code or a wireless data communication signal. Receiving the token and the second location data from the second client device may comprise receiving a secure signed message including the token and the second location data. According to one embodiment the method further comprises determining whether the first location and the second location are at a location associated with the job item. The scanning code may include a time stamp. In a further embodiment, the method further comprises receiving a time of scan of the scanning code from the second client device and verifying the delivery data based on a comparison of the time stamp and the time of scan of the scanning code. In yet another embodiment, the method further comprises configuring the first client device to transmit the token to the server based on an activation of a self-check-in feature and a determination by the first client device that the first client device is within a given proximity to a location associated with the job item. The job item may include an expected start date, an expected end date, expected job open time, and expected job close time.

Another embodiment may include the method further comprising receiving, by the server, the job item from the second client device, and placing, by the server, the job item for bidding based on criteria specified by the second client device. The criteria may include transaction type, date of when the bidding ends, equipment type, material type, and quantity of equipment or material. The method may also further comprise receiving, by the server, a bid for the job item from the first client device, and receiving, by the server, an indication of acceptance of the bid from the second client device. In a further embodiment, the method further comprises accepting, by the server, a bid for the job item from the first client device based on criteria including bid price, rating of a job servicer associated with the first client device, whether the job servicer is associated with a minority-owned company, and whether the job servicer is on a preferred list.

The system comprises a server comprising a memory device having executable instructions stored therein, and a processing device. The processing device in response to the executable instructions is operative to store at least one job item in a database, receive delivery data associated with the job item, the delivery data received from a first client device and including a first location data from the first client device, generate a token associated with the delivery data, transmit the token to the first client device, wherein the first client device generates a scanning code that represents the token, receive the token and a second location data from a second client device, the token decoded from the scanning code by the second client device, verify the delivery data based on a determination that the first location and the second location data are within a given distance from each other, and transmit the delivery data and a verification of the delivery data to the second client device.

The non-transitory computer-readable media comprises computer program code for storing at least one job item in a database of a server, computer program code for receiving delivery data associated with the job item, the delivery data received from a first client device and including a first location data from the first client device, computer program code for generating a token associated with the delivery data, computer program code for transmitting the token to the first client device, wherein the first client device generates a scanning code that represents the token, computer program code for receiving the token and a second location data from a second client device, the token decoded from the scanning code by the second client device, computer program code for verifying the delivery data based on a determination that the first location and the second location data are within a given distance from each other, and computer program code for transmitting the delivery data and a verification of the delivery data to the second client device.

BRIEF DESCRIPTION OF THE DRAWINGS

The invention is illustrated in the figures of the accompanying drawings which are meant to be exemplary and not limiting, in which like references are intended to refer to like or corresponding parts.

FIG. 2 illustrates an exemplary interface for creating a new site according to an embodiment of the present invention.

FIG. 4 illustrates an exemplary interface for job route details according to an embodiment of the present invention.

FIG. 5 illustrates an exemplary job list according to an embodiment of the present invention.

FIG. 7 illustrates an exemplary interface including details of job awaiting bids according to an embodiment of the present invention.

FIG. 13 illustrates an exemplary interface for creating a company according to an embodiment of the present invention.

DETAILED DESCRIPTION OF THE INVENTION

Figure 1:
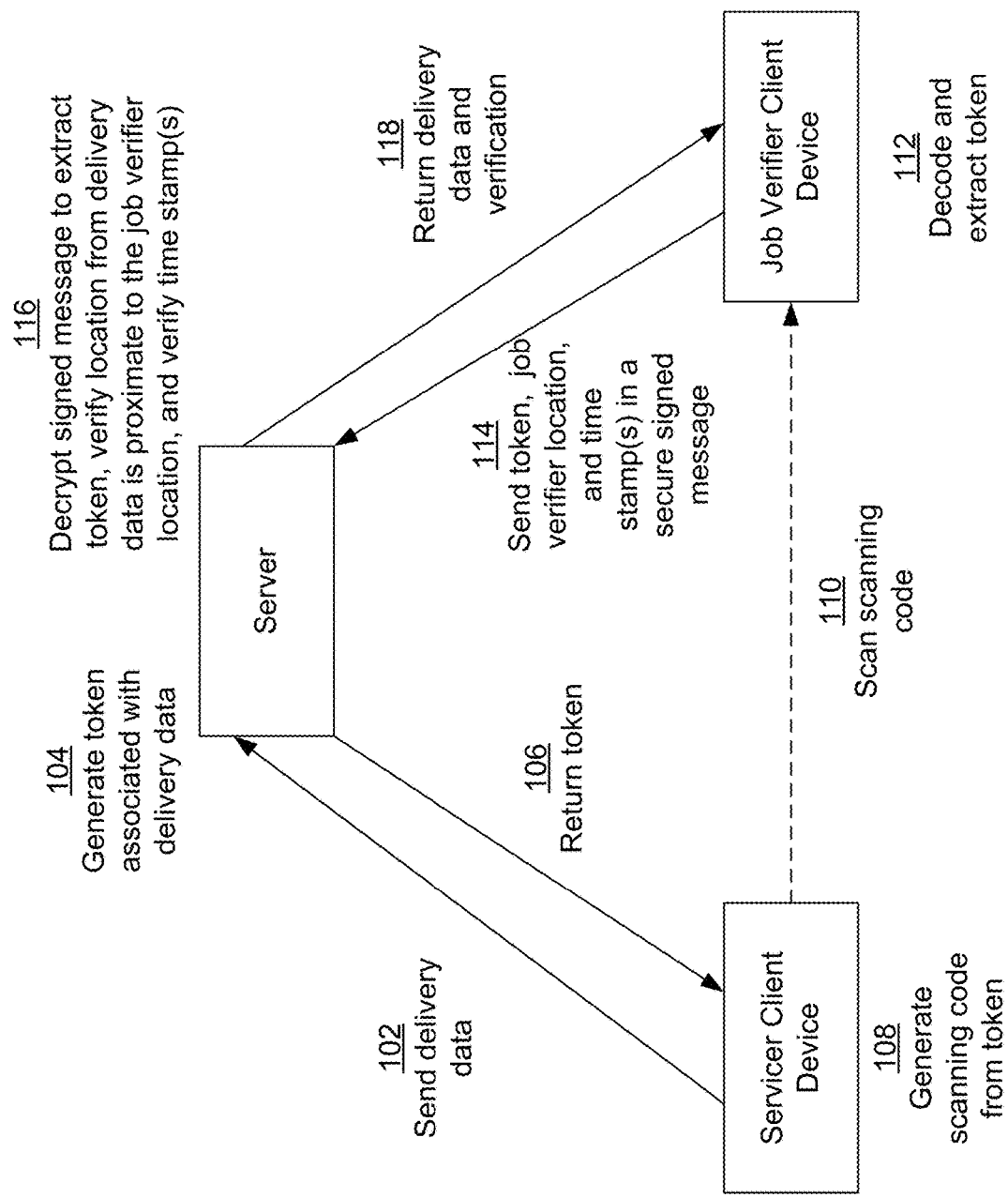
FIG. 1 illustrates a system flowchart according to an embodiment of the present invention.

Subject matter will now be described more fully hereinafter with reference to the accompanying drawings, which form a part hereof, and which show, by way of illustration, exemplary embodiments in which the invention may be practiced. Subject matter may, however, be embodied in a variety of different forms and, therefore, covered or claimed subject matter is intended to be construed as not being limited to any example embodiments set forth herein; example embodiments are provided merely to be illustrative. It is to be understood that other embodiments may be utilized and structural changes may be made without departing from the scope of the present invention. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The present application discloses technology and a system that can be used to track the completion of jobs and deliveries, especially for construction sites. For example, the system can be used to track when an electrician or plumber has begun working at a work site, is in the middle of, or has completed an assigned job. Job servicers (such as drivers) may be presented with an interface on their client device that shows the jobs for which they've been awarded bids. The servicer may "check-in" to job sites associated with their jobs. The servicer may have a list of scanning codes associated with each of their jobs. When the servicer, who has been authorized to work on a job, is ready for the job, he/she may access the job on their client device (e.g., "check-in to site") to generate and display a scanning code of the job. The scanning code can then be scanned by another client device, generally held by the person at the work site (a "job verifier"), such as a site supervisor, who is responsible for checking people into the job site or verifying deliveries. In most instances, the job verifier is usually associated with a job creator (or person soliciting a service). The servicer's location data or coordinates, a timestamp, as well as job, truck, and various other information may be sent to a server and then converted into a delivery data object. The servicer may transmit his/her current location data, via a client device, to the server and digitally sign the location data to allow the server to verify that the data was not spoofed.

Different roles may be assigned to certain individuals within an entity (e.g., a CEO, CFO, company driver, etc.) in the system. Each entity and each role within an entity may be provided with specific features and functionality in the system, according to the functionality that they are assigned. These features and functionalities may be governed by a permissioning system. The specific permissions can be given by the person(s) at the entity who has authority to do so such as an administrator. The application on a user's client device may configure itself according to the type of user. For example, a construction company owner or a manager at the construction company, who is responsible for creating and managing jobs, can see a list of active jobs and who has been checked in/scanned into work on his construction site, or job location.

FIG. 1 presents a system flowchart according to an embodiment of the present invention. The disclosed system may include an application used by entities, such as, construction companies, material suppliers, earth-moving contractors, shipping companies, subcontractors, and independent owner operators to track and verify job completion. The application may be installed or loaded on a user's client device to communicate with a server and access features and functionalities of the system. Client devices may comprise computing devices (e.g., desktop computers, terminals, laptops, personal digital assistants (PDA), cell phones, smartphones, tablet computers, e-book readers, smart watches and wearable devices, or any computing device having a central processing unit and memory unit capable of connecting to a network). Client devices may also comprise a graphical user interface (GUI) or a browser application provided on a display (e.g., monitor screen, LCD or LED display, projector, etc.). A client device may vary in terms of capabilities or features. For example, a web-enabled client device, which may include one or more physical or virtual keyboards, mass storage, one or more accelerometers, one or more gyroscopes, global positioning system (GPS) or other location identifying type capability, or a display with a high degree of functionality, such as a touch-sensitive color 2D or 3D display.

A client device may include or execute a variety of operating systems, including a personal computer operating system, such as a Windows, Mac OS or Linux, or a mobile operating system, such as iOS, Android, or Windows Mobile, or the like. A client device may also include or execute an application to communicate content, such as, for example, textual content, multimedia content, or the like. A client device may include or may execute a variety of possible applications, such as a client software application enabling communication with other devices, such as communicating one or more messages, such as via email, short message service (SMS), or multimedia message service (MMS).

A server is operative to receive, from client devices, requests for jobs (pick-up, drop-off, delivery, tasks, etc.), and check-ins for the created jobs by servicers (e.g., contractors, subcontractors, shippers, workers, etc.), verify the created jobs, and generate responses to the client devices across the network. Details for a job/task, e.g., the type of job, start and end date and time, etc., can be created and stored to a database on the server over a communications network by the job creator. Servers, as described herein, may vary widely in configuration or capabilities but are comprised of at least a special-purpose digital computing device including at least one or more central processing units and memory. A server may also include one or more of mass storage devices, power supplies, wired or wireless network interfaces, input/output interfaces, and operating systems, such as Windows Server, Mac OS X, Unix, Linux, FreeBSD, or the like. Embodiments of the present invention are capable of being implemented in conjunction with to a cloud computing environment. Cloud computing may include a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service.

The communications network may be any suitable type of network allowing transport of data communications across thereof. The network may couple devices so that communications may be exchanged, such as between the server and client devices or other types of devices, including between wireless devices coupled via a wireless network, for example. In one embodiment, the network may be the Internet, following known Internet protocols for data communication, or any other communication network, e.g., any local area network (LAN) or wide area network (WAN) connection, cellular network, wire-line type connections, wireless type connections, or any combination thereof. Communications and content stored on the server and/or transmitted to and from client devices may be encrypted using, for example, the Advanced Encryption Standard (AES) with a 256-bit key size, or any other encryption standard known in the art.

A servicer client device can send delivery data associated with a particular job to the server, 102. The delivery data may indicate a pick-up, drop-off, delivery, service, job or task that has been performed by a servicer associated with the servicer client device. The delivery data may also include a current location of the servicer client device and other details, such as, pick-up location, pick-up date and time, drop-off location, and drop-off date and time. The server may receive the delivery data and store it as a delivery data object in a database. A token associated with the delivery data is generated by the server, 104. The delivery data may be used to generate the token. The token may be saved on the server with the delivery data object and registered to the entity (job creator) that created the job.

Tokenization can be used to secure the delivery data when it's being transmitted or stored. The process of tokenization may randomly transform the delivery data into a random string of characters in a token and store the mapping of the transformation at the server. The stored mapping contains the relationship between the delivery data and the token. Additionally, the delivery data stored in the database may be secured via encryption.

The token is returned to the servicer client device from the server, 106. Tokens may serve as a reference to the original delivery data without including the actual data. The servicer client device uses the token to generate a scanning code, 108. The servicer client device may calculate or generate a scanning code that is representative of the token received from the server. The scanning code on the servicer client device may be presented (or transferred) to and scanned by a job verifier client device (to "check-in"), 110. A job may require one or more check-ins that are representative of various milestones for the job. The scanning code may be one-dimensional barcodes or two-dimension barcodes (e.g., Quick Response ("QR") codes). According to alternative embodiments, the scanning code may also be data or signals that can be communicated to the job verifier client device using Near Field Communication (NFC), Bluetooth 802.15, or any other wireless network communications protocols or systems. Scanning codes may also be encrypted such that a standard code scanner cannot read them. In additional embodiments, the scanning codes may be time stamped, and the latitude and longitude of the servicer client device may also be stored in the scanning codes to prohibit fraud when a code is scanned (e.g., by taking a picture of the code and sending it to another phone and reuse the same code at a different location and within a specified period of time).

The job verifier device can decode the scanning code and extract the token, 112. The token may then be transmitted along with the location of the job verifier client device and one or more time stamps (e.g., time scanning code is generated at 108 and time of scanning at 110) to the server in a secure signed message, 114. The location of the job verifier client device may be used by the server to validate the delivery data. A digital signature may be included in the transmission of the token and the job verifier client device location to help the server verify an authentic message from a job verifier. The digital signature may include a certificate and public key, and is associated with a specific user to authenticate the source of messages.

The server can authenticate the secure message to verify that the sender of the message is from the job verifier. The token in the secure message can then be decrypted and the location of the job verifier client device can be used to verify that the location from the delivery data is proximate to the job verifier location and that the one or more time stamps indicate the time of scanning and the time the scanning code was generated are consistent or proximate to each other, 116. The server may decrypt the token from the secure signed message to identify the corresponding delivery data object and calculate the distance between the locations of the servicer device and the job verifier client device. The scanning of the scanning code from 110 can be verified if the distance between the locations of the servicer and job verifier devices is within a specific range or given proximity to each other. The server may also determine that the location of both devices corresponds to the location of the job site, or pick-up/drop-off locations. The delivery data and the verification by the server is returned to the job verifier client device, 118. Verification of the scan or check-in allows the server to return data from the delivery data object stored in the database and validate the scanning code (check-in) presented by the servicer client device to the job verifier client device. However, if the scanning of the scanning code cannot be verified, an invalid message may be returned to the job verifier device.

FIG. 2 presents an exemplary interface for creating a new site according to an embodiment of the present invention. A company entity (a job creator) may create a new job site. The job site may be given a name and a location. The location may be provided by inputting an address, geographical coordinates, or automatically detected by the client device. Other information such as start date of work, projected end date of work, site open time, and site close time. The company entity may also associate pictures or photographs with the job site.

Figure 3:
FIG. 3 illustrates an exemplary interface for adding a job to a job site according to an embodiment of the present invention.

FIG. 3 presents an exemplary interface for adding a job to a job site according to an embodiment of the present invention. Upon creating the job site, new jobs may be added to the job site. Jobs added to the job site may be posted for job servicers to view and bid on. A job may be given a name (e.g., that is descriptive of the job). The job may also be given an expected start date of work, expected end date of work, expected job open time, and expected job close time. A job creator can set a bid price of the job. According to one embodiment, bids can be specified with a fixed-price, where the job creator can specify the amount or rate to be paid (e.g., per load or per hour or per ton) and job servicers accept or reject the bid. In another embodiment, job creators can allow a plurality of servicers to bid on the job with their "best prices for the job." The job creator may also select transaction type (e.g., hours, loads, and tons), a date for when bidding for the job ends, equipment type, material type, or quantity of equipment/material.

FIG. 4 presents an exemplary interface for job route details according to an embodiment of the present invention. The job creator may specify criteria for a job along the "job route." The criteria may include invoice due frequency and payment due frequency. Another criteria that may be configured is the check-in type, e.g., via a scanning code or self-check-in. The scanning code may further be configured to be displayed on a client device screen of the job servicer or wirelessly transmitted from a servicer client device to a job verifier client device.

In instances where the job creator doesn't have a person or client device to scan the job servicer at the work site, the self-check-in capability can be used for paper ticket elimination and pick-up and drop-off validation. The self-check-in feature includes activating the job servicer's client device's GPS and determining whether it is approaching a pick-up/drop-off site, and prompts the job servicer to push a pick-up/drop-off button. Self check-in may record and transmit the job servicer's name, a geo-location stamp of the job servicer's client device, date and time of the pick-up or drop-off, type of truck used for the job, and a picture of the picked-up or dropped-off load (either as unsecured data or in the form of a token) to a server.

The job creator may also specify a scan location (e.g., at pick-up or drop-off). The scan location may be used to specify that scanning may be performed by job servicers (e.g., drivers) at the drop-off location, in addition to the pick-up location. The scan location may be further configured to include a haul-back job, where a load is picked-up at one location, dropped-off at another location, a new load is picked-up at the drop-off site and then delivered to a third location.

The payee of a scan fee can be toggled between, for example, between a company or driver. A scan fee may be charged to either the job servicer or the job creator, depending on how the job was created, every time the job servicer's client device is scanned for a pick-up. For example, the scan fee may be a minimum of $1.50 or 3% of a per load price. For haul-back jobs, the scan fee may be charged again when the second load is picked-up. According to certain embodiments, a picture of the load may be required to verify a check-in or completion of a job. A geo-fence may also be toggled or configured as part of the check-in process. The geo-fence may include a virtual boundary defined by GPS or location-tracking technology, that enables check-in to trigger when a servicer client device enters or leaves a particular area (e.g., location of pick-up or drop-off). The job can also be configured for inclusion in a job board service for matching jobs created by job creators with job servicers.

In one embodiment, job route details may include a requirement for recording payload weight, for example, the weight of a truck when it is empty and after it has been loaded. In this case, if the job creator creates a job that requires that the truck weight be recorded, the number of tons being carried can be precisely measured. When the job servicer is checked-in at a site, the system allows the scanner (job verifier client device) to note the truck's empty weight, after it has been weighed on a truck scale and then the system may notify the job servicer to check-in again after the truck has been loaded with a load or material being picked-up and weigh the truck again. As such, the system records both weights and reports the actual tonnage picked-up.

FIG. 5 presents an exemplary job list according to an embodiment of the present invention. The job list may display current, pending, and past jobs. Jobs may be listed by job name and displayed with details such as number of bids, bid time, and bid price. The job creator is able to, in real-time, view bids that have been received from various job servicers and select bids from job servicers that the job creator wishes to award. Bids may be selected to view additional details.

Figure 6:
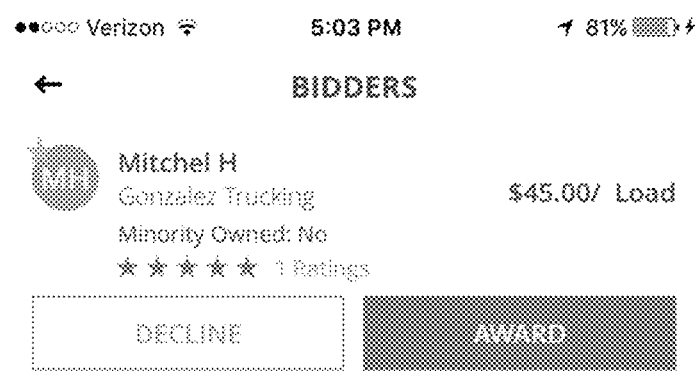
FIG. 6 illustrates an exemplary interface for awarding jobs to job servicers according to an embodiment of the present invention.

FIG. 6 presents an exemplary interface for awarding jobs to job servicers according to an embodiment of the present invention. The interface may be used to award or decline job servicers who have bid on jobs. Job servicers who win bids may be provided with a unique scanning code for scanning by a user associated with the company entity (e.g., a job verifier) at a job site. Alternatively, a job creator may select and view details (e.g., desired bid amount or rate, equipment type, material type, scan fee payer, distance from pick-up, distance between pick-up to drop-off, and driver assignment) of a job that is waiting for bids, as illustrated in FIG. 7, and enable or disable an automatic award feature, "Auto Award Bids" 702. The "Auto Award Bids" 702 feature may utilize an algorithm that decides awards based on one or more preferential settings. For example, the system may automatically award jobs based on at least one of the following criteria: bid price, the rating of the job servicer, whether the job servicer is associated with a minority-owned company, or whether the job servicer is on the job creator's "preferred list" or a global preferred list. The system may execute an algorithm that creates a composite score based on one or more of these criteria.

An "Assign Drivers" 704 feature may allow a job creator to use "company drivers." Company drivers may work for the job creator, e.g., a construction company or material supplier, as opposed to being independent owner-operators. In this case, scan fees may still be charged but an additional service fee may also be charged for every delivery. Assign Drivers 704 may be similar to a "clip board" where a site supervisor may assign drivers on his/her clip board to a particular job for a specific period of time. Drivers can be dynamically reassigned as needed.

Figure 8:
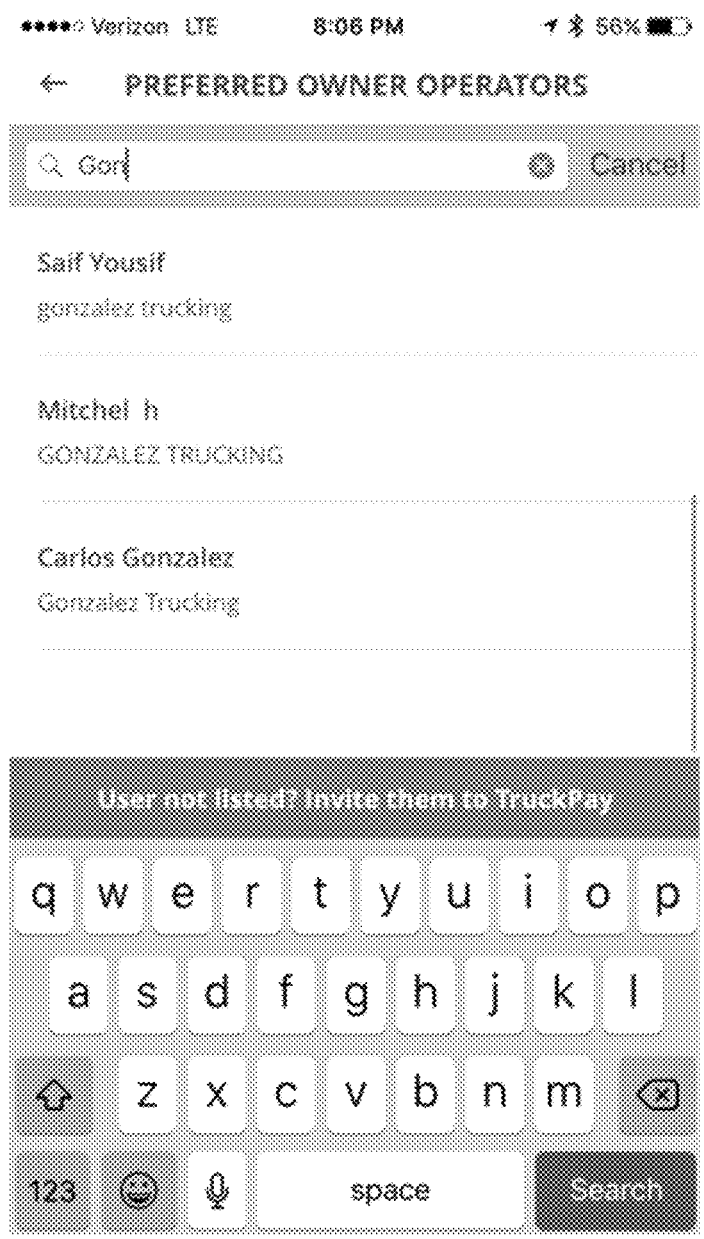
FIG. 8 illustrates an exemplary interface for locating preferred owner operators according to an embodiment of the present invention.

FIG. 8 presents an exemplary interface for locating preferred owner operators according to an embodiment of the present invention. Job creators may create preferred job servicer lists and search the lists for job servicers. The job creators may also invite parties to join the disclosed system to become job servicers that are able to bid on jobs. Preferred job servicers may be listed first when awarding bids.

Figure 9:
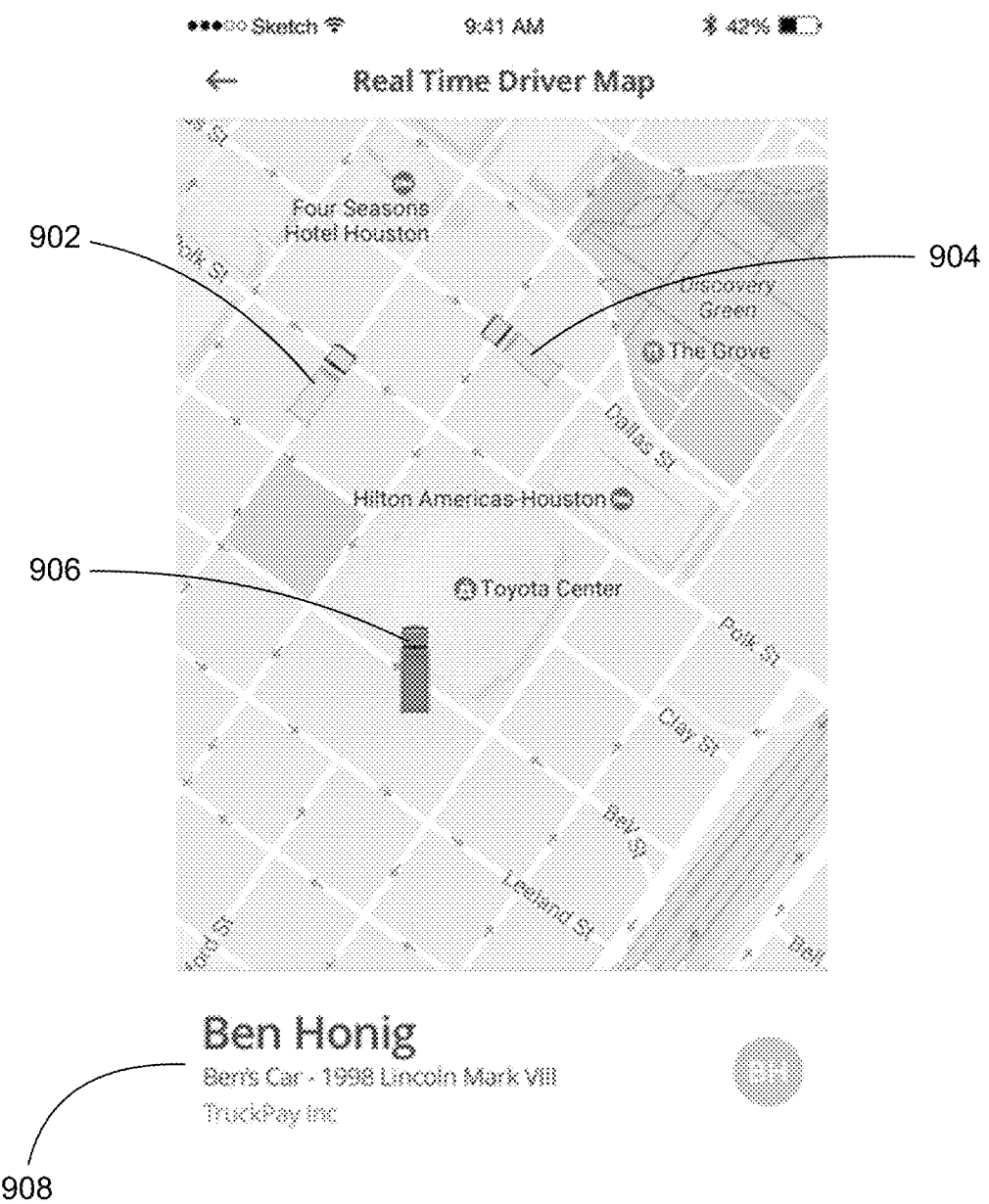
FIG. 9 illustrates an exemplary real-time job servicer map interface according to an embodiment of the present invention.

FIG. 9 presents an exemplary real-time job servicer map interface according to an embodiment of the present invention. Job creators may view the location of job servicers as they travel around in real-time while they work on jobs. The job creators can track job servicers on a real-time map and watch the job servicers as they perform, for example, pick-ups and drop-offs for a job. The disclosed system is capable of displaying multiple job servicers 902, 904, and 906 simultaneously on a map that may be moving in different directions as they execute jobs. Each job servicer may be displayed as various vehicle icons and/or differentiated by color according to job. The job creator may select a given job servicer 906 to display additional information 908 which includes details such as the job servicer's name and vehicle type. In one embodiment, routes taken by each job servicer for a particular job or task may be recorded and shown to the job creator (such as route details 1108 illustrated in FIG. 11), for example, on each invoice, prior to the job creator paying the invoice.

Figure 10:
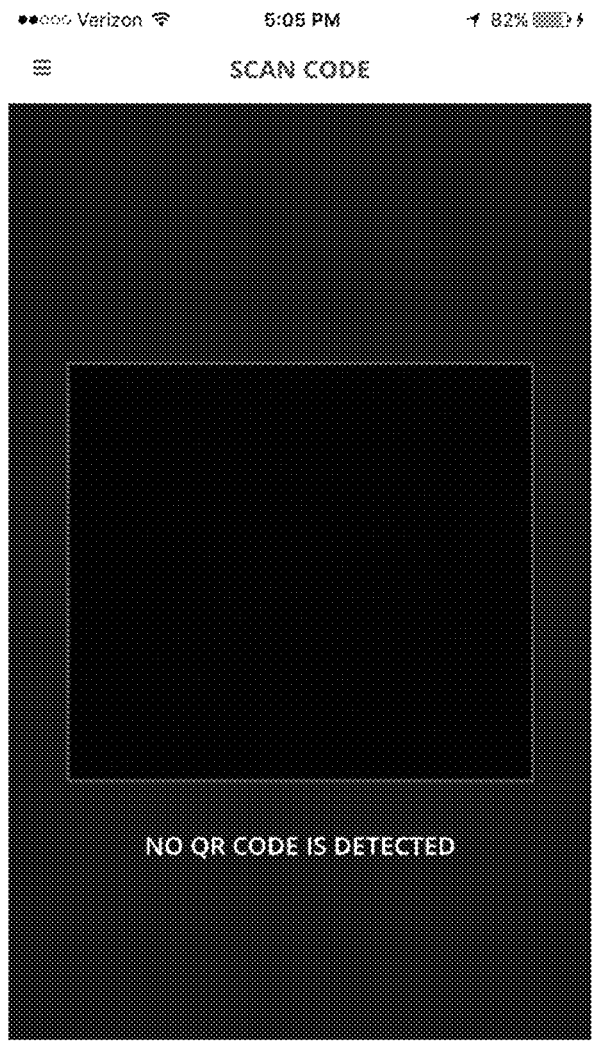
FIG. 10 illustrates a scanning code according to an embodiment of the present invention.

FIG. 10 presents a scanning code according to an embodiment of the present invention. Job servicers may, for example, arrive at a job site such as a construction site and present a scanning code, as presented in FIG. 10, to a site operator where the site operator may scan the code to verify pick-up, drop-off, or completion of a job or task.

Figure 11:
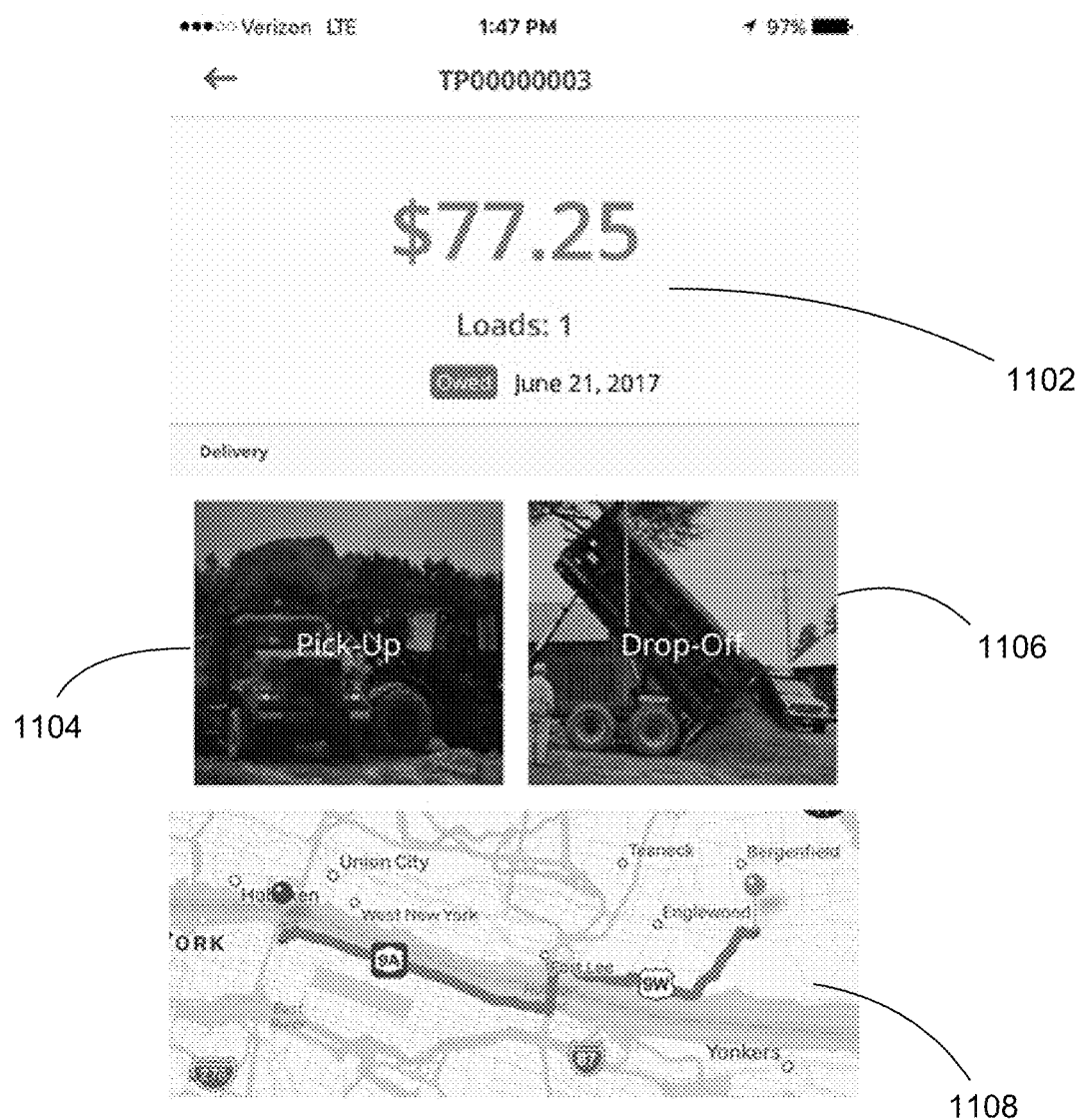
FIG. 11 illustrates an exemplary invoice according to an embodiment of the present invention.

FIG. 11 presents an exemplary invoice according to an embodiment of the present invention. The disclosed system may include a feature for generating invoices including photographs for verifying completion of one or more phases of a job. The exemplary invoice includes an owed balance 1102, pick-up 1104, drop-off 1106, and route details 1108. The owed balance may comprise a balance amount, a number of loads (optional) and a date of which the balance is due. For example, job servicers may be required to obtain photographic evidence of the completion of certain activities related to a job such as pick-up 1104 and drop-off 1106. Photographs can be taken by the job servicers and uploaded to a server configured for verifying job completion.

Figure 12:
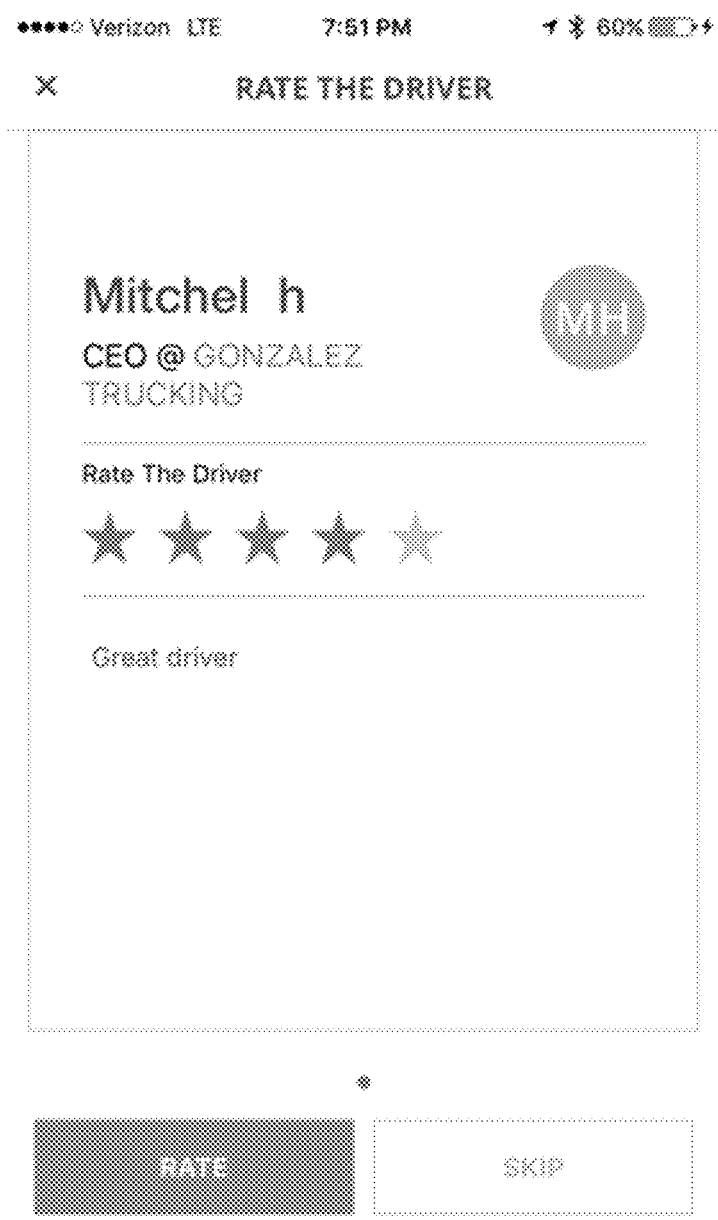
FIG. 12 illustrates an exemplary interface for rating a driver according to an embodiment of the present invention.

FIG. 12 presents an exemplary interface for rating a driver according to an embodiment of the present invention. Job creators may rate job servicers after job completion. Job servicers may be added to a "deck" of cards where each card is representative of job servicer. The deck of job creators may be navigated by "swiping," for example, left and right, where each card may be given a rating or skipped. Job servicers can be rated based on a number of stars and a description corresponding to the number of stars (e.g., more stars indicate higher rating). Ratings may be given to job servicers either individually or collectively (e.g., as a company), as there may be multiple job servicers working on a job. Job servicers can rate companies to indicate which companies are desirable to work with.

FIG. 13 presents an exemplary interface for creating a company according to an embodiment of the present invention. Job servicers may create a company by providing information such as company name, company federal tax type, and company description. Companies may also indicate whether it is a minority company, and if so, indicate its minority company type and minority company certification number. Minority-owned companies may be given special consideration, such as, for government agency sponsored jobs.

Figure 14:
FIG. 14 illustrates an exemplary interface for searching jobs according to an embodiment of the present invention.
Figure 15:
FIG. 15 presents an exemplary interface for placing a bid for a job according to an embodiment of the present invention.

FIG. 14 presents an exemplary interface for searching jobs according to an embodiment of the present invention. A servicer may view nearby jobs based on a matching of jobs at job sites to the servicer's location (either manually inputted or determined by the client device's location data). A job may be selected and presented to the servicer for bidding. FIG. 15 presents an exemplary interface for placing a bid for a job according to an embodiment of the present invention. Details of the job, such as, job location(s), directions (from the "GET DIRECTIONS" button 1502, start date, end date, and price rate may be presented to a job servicer. Job servicers may place a bid by selecting the "PLACE BID" button 1504.

Figure 16:
FIG. 16 presents an exemplary interface for adding a vehicle to a job servicer's profile according to an embodiment of the present invention.
Figure 16:

FIG. 16 presents an exemplary interface for adding a vehicle to a job servicer's profile according to an embodiment of the present invention. The illustrated embodiment includes input fields for providing information for adding a truck. Information that may be provided includes truck name, vehicle identification number, license plate number, capacity, tank size, fuel usage (miles per gallon), and vehicle insurance information. The job servicer may provide the vehicle insurance information by uploading vehicle insurance documents. A job servicer can scan and upload vehicle and general liability insurance documents such that job creators can instantly retrieve the documents and verify that the job servicer has the required insurances.

Figure 17:
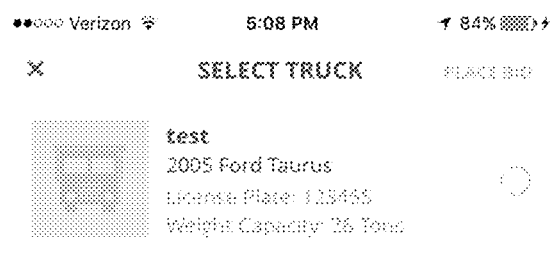
FIG. 17 presents an exemplary interface for selecting a vehicle for a job according to an embodiment of the present invention.

Registered vehicles or equipment may be selected for assignment to the job for the bid. FIG. 17 presents an exemplary interface for selecting a vehicle for a job according to an embodiment of the present invention. Job servicers may select a vehicle from their profiles for submission with bids for jobs. Vehicles may be identified by vehicle make and model, license plate number, and weight capacity.

Figure 18:
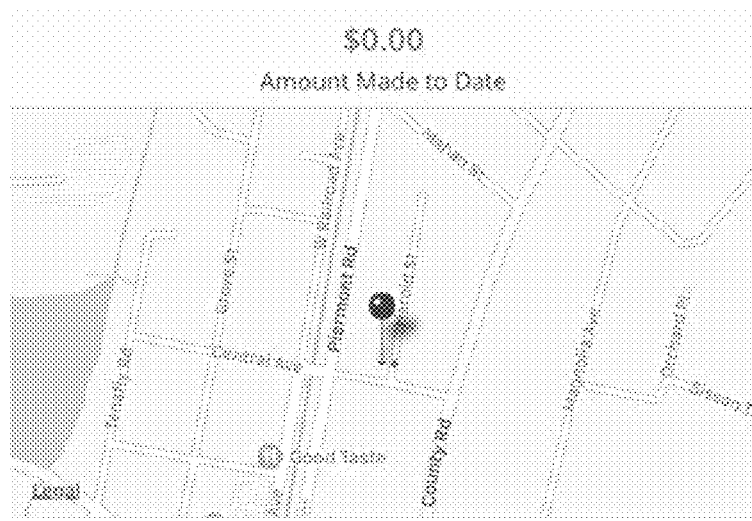
FIG. 18 presents an exemplary interface for checking in to a job site according to an embodiment of the present invention.

FIG. 18 presents an exemplary interface for checking in to a job site according to an embodiment of the present invention. The illustrated interface may be retrieved or accessed by a job servicer that has been awarded a job. The interface includes details of the job such as an amount made to date, pick-up and/or drop-off locations (or job sites), a map of the pick-up and/or drop-off locations, a directions button 1802 for providing navigational directions to the pick-up or drop-off locations, general information of the job (including start date, end date, and payment amount), and a "check in to site" button 1804. The job screen can also allow the servicer to report attendance or a job status via the "check in to site" button to generate a unique scanning code.

Job servicers may check in to the job site upon arrival and present a scanning code associated with the job to a job verifier at the job site. Selecting the "check in to site" button may either present a scanning code to be scanned or transmitted to a job verifier's client device, or facilitate self-check. Servicers that have been awarded the job and have the appropriate scanning code for that job are allowed to pass the scan by the job verifier. When a servicer checks into a job location, the servicer's coordinates, a timestamp, as well as job, truck, and various other information may be sent to the server and then converted into delivery data. Once the delivery data is created, the server can return an encrypted hash to the servicer's client device. The encrypted hash may be embedded in the scanning code. The unique scanning code may be displayed on the servicer's client device for scanning by a job verifier with another client device. If the scanning code is invalid, then the job verifier's device may indicate that and the servicer's task or deliverable will not be registered with the system.

Figure 19:
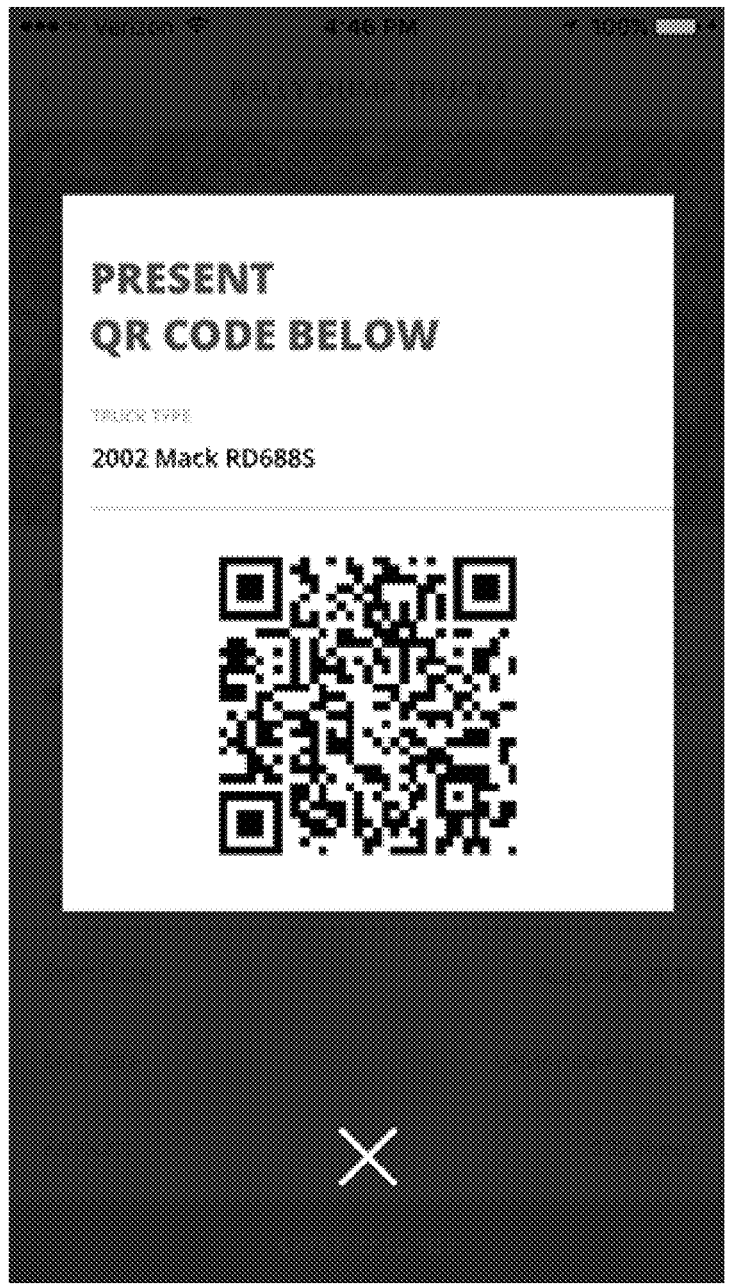
FIG. 19 presents of an exemplary scanning code according to an embodiment of the present invention.

FIG. 19 presents an exemplary scanning code according to an embodiment of the present invention. The exemplary scanning code may be displayed on the servicer's client device and presented to a job verifier for scanning at a job location. Once the scanning code is scanned, the job verifier can post their coordinates to the server, along with the hash embedded in the scanning code. The server is operable to decrypt the hash and return the unencrypted data to the scanner. During the code scanning process, fraudulent codes can be detected by matching the time of scan, received from the job verifier client device, along with the time that the scanning code was generated (e.g., a time stamp), and determine that the scan location of the scanning code is within a dynamically set geo-fence. This prevents a servicer, for instance, from taking a screenshot of their scanning code and sending it to another device to try to get paid for a job twice. According to one embodiment, as part of the verification process, job creators can enable a feature to require a picture of a deliverable or job condition, be taken, for example, at time of pick-up or task initiation and a picture of the drop-off, or task completion can be taken as well. The picture(s) may then be shown (or uploaded) via a client device (of the servicer and/or job verifier) to an accounts payable person associated with the job creator, or whomever is responsible for paying invoices, so that the accounts payable person can see that the deliverable that was supposed to be picked up and dropped off, was actually done. The photographs may be time- and geo-location-stamped such that fraudulent pictures can't be taken at a different location.

FIGS. 1 through 19 are conceptual illustrations allowing for an explanation of the present invention. Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps). In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer readable medium," "computer program medium," and "computer usable medium" are used to generally refer to media such as a random access memory (RAM); a read only memory (ROM); a removable storage unit (e.g., a magnetic or optical disc, flash memory device, or the like); a hard disk; or the like.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

What is claimed is:

1. A method for verifying job deliveries, the method comprising:
    storing, by the server, at least one job item in a database, the at least one job item comprising a start date and an end date for the job item, and a defined pick-up or drop-off location for the job item;
    receiving, by the server, delivery data representative of a completion of an activity included in the job item, the delivery data received from a first client device of a servicer authorized to work on the at least one job item and including a first location data of the first client device;
    generating, by the server, a token including data representative of the delivery data;
    transmitting, by the server, the token to the first client device, wherein the first client device generates a scanning code that encodes the token and the delivery data associated with the job item, including at least the start date and end dates for the job item;
    receiving, by the server from a second client device corresponding to a creator of the at least one job item, the token and a second location data of the second client device, the token decoded from the scanning code by the second client device via a check-in by the first client device;
    verifying, by the server, the delivery data based on a determination that the first location and the second location data are within a given distance from each other and within a given distance of the defined location for the job item, and that the delivery data is within a time frame defined by the start date and end date of the job item; and
    transmitting, by the server, the delivery data and a verification of the delivery data to the second client device.

2. The method of claim 1 wherein the delivery data includes an activity selected from a group consisting of: pick-up, drop-off, delivery, type of service, job, and task.

3. The method of claim 1 wherein the scanning code comprises a bar code.

4. The method of claim 1 wherein the scanning code comprises a wireless data communication signal.

5. The method of claim 1 wherein receiving the token and the second location data from the second client device comprises receiving a secure signed message including the token and the second location data.

6. The method of claim 1 wherein the delivery data includes one or more photographs associated with a completion of the job item.

7. The method of claim 1 wherein the scanning code includes a time stamp.

8. The method of claim 7 further comprising: receiving, by the server, a time of scan of the scanning code from the second client device; and verifying, by the server, the delivery data based on a comparison of the time stamp and the time of scan of the scanning code.

9. The method of claim 1 wherein the job item includes expected job open time and expected job close time, and wherein verifying the delivery data is further based on delivery occurring between the expected job open time and the expected job close time.

10. The method of claim 1 further comprising: receiving, by the server, the job item from the second client device; and placing, by the server, the job item for bidding based on criteria specified by the second client device.

11. The method of claim 10 further comprising: receiving, by the server, a bid for the job item from the first client device; and receiving, by the server, an indication of acceptance of the bid from the second client device.

12. The method of claim 10 further comprising accepting, by the server, a bid for the job item from the first client device based on criteria including bid price, rating of a job servicer associated with the first client device, whether the job servicer is associated with a minority-owned company, and whether the job servicer is on a preferred list.

13. A system for verifying job deliveries, the system comprising: a server comprising: a memory device having executable instructions stored therein; and a processing device, in response to the executable instructions, operative to:
    store at least one job item in a database, the at least one job item comprising a start date and an end date for the job item, and a defined pick-up or drop-off location for the job item;
    receive delivery data representative of a completion of an activity included in the job item, the delivery data received from a first client device of a servicer that is authorized to work on the at least one job item and including a first location data of the first client device;
    generate a token including data representative of the delivery data;
    transmit the token to the first client device, wherein the first client device generates a scanning code that encodes the token and the delivery data associated with the job item, including at least the start date and end dates for the job item;
    receive from a second client device corresponding to a creator of the at least one job item the token and a second location data of the second client device, the token decoded from the scanning code by the second client device via a check-in by the first client device;
    verify the delivery data based on a determination that the first location and the second location data are within a given distance from each other and within a given distance of the defined location for the job item, and that the delivery data is within a time frame defined by the start date and end date of the job item; and
    transmit the delivery data and a verification of the delivery data to the second client device.

14. The method of claim 1, wherein the job item further comprises a site open time and a site close time, and wherein verifying delivery data further comprises determining that pick-up or drop-off occurs between the site open and close times.

15. The method of claim 1, wherein the job item is further defined to require pick-up or drop-off of a plurality of item or service units and wherein the token is generated and verified for each of the plurality of item or service units.

16. The method of claim 1, wherein the job item defines pick-up or drop-off of a plurality of truck loads of construction material and wherein the token is generated and verified for each of the plurality of the truck loads.

17. The method of claim 1, wherein the job item defines delivery of a plurality of construction services and wherein the token is generated and verified for each of the plurality of construction services.

18. The method of claim 1, comprising:
    causing an interface screen to be displayed, the interface screen displaying form elements for a job creator to specify a job site, associate the job site with a plurality of job items, and specify criteria for each of the plurality of job items, including at least one of a pickup location and a drop-off location, a transaction type, equipment or material type, and a quantity of equipment or material; and storing in the database the job criteria in association with each of the plurality of job items, wherein the scanning code encodes of the specified criteria for each of the job items.

19. The method of claim 18, comprising causing an interface screen to be displayed with form elements therein for the job creator to specify for each of the plurality of job items whether a given job item is for a set price or an auction and an end of bidding for the auction.

20. The method of claim 18, comprising causing an interface screen to be displayed with form elements therein for the job creator to specify for each of the plurality of job items whether a given job item requires a scanning code or self check-in.

21. The method of claim 20, comprising causing an interface screen to be displayed with form elements therein for the job creator to specify for each of the plurality of job items whether a scan location for a given job item requires a drop-off or a pick-up.

22. The method of claim 20, wherein the creator specifies for at least one of the job items requires self check-in and for each of the self check-in job items the first client device displays a self check-in interface face including form elements for users to transmit the user's name, a geo-location stamp of the first client device, date and time of the pick-up or drop-off.

23. The method of claim 22, wherein the when the first client device determines that it is approaching the defined location and displays the self check-in interface in response thereto.

24. The method of claim 23, the self check-in interface further including a check-in button what when activated causes the scanning code to be generated.

25. The method of claim 22, the self check-in interface further including form elements for users to transmit a type of equipment used for the job and a picture of the picked-up or dropped-off load.

26. The method of claim 18, comprising causing an interface screen to be displayed with form elements therein for the job creator to specify each of the plurality of job items driver assignment and generating the scanning code that further encodes driver data.

\* \* \* \* \*